United States Patent [19]
Lindbauer et al.

[11] Patent Number: 4,839,147
[45] Date of Patent: Jun. 13, 1989

[54] METHOD OF PURIFYING COMBUSTION PRODUCT GASES CONTAMINATED WITH DUST AND NOXIOUS GASES

[75] Inventors: Ralf Lindbauer, Graz; Alfred Glasner, Passail, both of Austria

[73] Assignee: Waagner-Biro Aktiengesellschaft, Vienna, Austria

[21] Appl. No.: 160,315

[22] Filed: Feb. 25, 1988

Related U.S. Application Data

[63] Continuation of Ser. No. 844,148, Mar. 26, 1986, abandoned.

[30] Foreign Application Priority Data

Apr. 5, 1985 [AT] Austria ................................. 1037/85

[51] Int. Cl.⁴ ...................... C01B 17/00; C01B 21/00; B01J 8/00
[52] U.S. Cl. .................................. 423/235; 204/174; 423/239; 423/242; 423/244
[58] Field of Search ............... 423/235, 239 A, 242 A, 423/244 A; 204/174

[56] References Cited

U.S. PATENT DOCUMENTS

| | | | |
|---|---|---|---|
| 4,385,039 | 5/1983 | Lowell et al. | 423/242 A |
| 4,442,079 | 4/1984 | Donelly et al. | 423/239 |
| 4,442,080 | 4/1984 | Donnelly et al. | 423/239 |
| 4,481,172 | 11/1984 | Lowell et al. | 423/242 A |
| 4,585,631 | 4/1986 | Pfeiffer | 423/235 |

*Primary Examiner*—John Doll
*Assistant Examiner*—Lori S. Freeman
*Attorney, Agent, or Firm*—Steinberg & Raskin

[57] ABSTRACT

In order to achieve the removal of $SO_2$ and $NO_x$ together with the entrained dust from the combustion product gases discharged from the combustion chamber of a steam generator in which sulfur-containing fuel, such as for instance lignite or brown coal is being burned, $NH_3$ and/or $NaHCO_3$ or chemical substances which release these compounds or react with the combustion product gases to form these compounds are introduced into the already partially cooled combustion product gases in the temperature region below 500° C. upstream of a dry separator, such as for instance a cloth filter. The entrained ashes are to contain CaO or Ca(OH)$_2$ and/or $Na_2CO_3$, especially from a previous desulfurization unit, prior to the introduction of the $NH_3$ thereinto.

19 Claims, 1 Drawing Sheet

METHOD OF PURIFYING COMBUSTION PRODUCT GASES CONTAMINATED WITH DUST AND NOXIOUS GASES

This is a continuation of application Ser. No. 844,148, filed 3/26/86 now abandoned.

BACKGROUND OF THE INVENTION

The present invention relates to the purification of gases in general, and more particularly to a method of purifying combustion product gases which are contaminated with dust and noxious gases.

There are already known various methods of purifying discharge gases which are contaminated with dust and noxious gases, especially combustion product gases discharged from fossil fuel burning plants, which carry entrained dust including alkali and/or alkaline earth compounds as they leave the combustion chamber and/or as a result of the addition thereto of alkali or alkaline earth compounds, especially at least one of $Ca(OH)_2$, $CaCO_3$, $NaHCO_3$, $Na_2SO_4$, $NaOH$, hydroxides, oxides, carbonates, sulfates, and bicarbonates, after the performance of a partial desulfurization. So, for instance, it is known to utilize lime for the desulfurization of the combustion product gases, and to blow this lime into the combustion chamber of the steam-generating boiler, as well as to separate the corresponding reaction product from the combustion product gases. In this single-stage process, there is generally obtained a desulfurization degree of 50%, which is too low to satisfy the current legal requirements. It is further known to arrange for a second sorbent addition (for instance $Ca(OH)_2$ and/or $NaHCO_3$) into the already partially cooled off combustion product gases, and in this manner to achieve a further desulfurization. However, even in this process the desulfurization degree is limited to about 80%, and no removal of $NO_x$ takes place. A separate arrangement, often provided with catalysts, is then provided for the removal of $NO_x$.

SUMMARY OF THE INVENTION

Accordingly, it is a general object of the present invention to avoid the disadvantages of the prior art.

More particularly, it is an object of the present invention to provide a method of removing contaminants from the combustion product gases, which method does not possess the drawbacks of the known methods of this kind.

Still another object of the present invention is to develop a method of the above type which renders it possible to increase the degree of desulfurization, at a minimum cost.

It is yet another object of the present invention to devise a method of the type here under consideration which renders it possible to simultaneously achieve a high degree of desulfurization and denitrification of the combustion product gases.

In keeping with these objects and others which will become apparent hereafter, one feature of the present invention resides in a method of purifying discharge gases which are contaminated with dust and noxious gases, especially combustion product gases discharged from fossil fuel burning plants, which carry entrained dust including alkali and/or alkaline earth compounds as they leave the combustion chamber and/or as a result of the addition thereto of alkali or alkaline earth compounds, especially at least one of $Ca(OH)_2$, $CaCO_3$, $NaHCO_3$, $Na_2SO_4$, $NaOH$, hydroxides, oxides, carbonates, sulfates, and bicarbonates, after the performance of a partial desulfurization, this method comprising the steps of reacting at least a partial stream of the dust-containing discharge gases in the temperature range below 500° C. with at least one member selected from the group consisting of $NH_3$, $NH_4OH$ and substances which yield such compounds by thermal decomposition, with attendant formation of pulverulent reaction products; and separating the pulverulent reaction products, together with the remaining entrained dust, from the combustion product gases in a dust separator. It is particularly advantageous when the reacting step includes adding the at least one member to the combustion product gases in dependence on the addition of lime and/or coal in the combustion chamber, and when the separating step includes passing the combustion product gases through a dry separator constructed as a cloth filter to prolong the dwell time of the reaction products in the combustion product gases and to avoid the separation of $NH_3$ or of $NH_4$-containing compounds in the separator.

It is further advantageous, if the reacting step is conducted under above-stoichiometric conditions, for the separating step to include washing the pulverulent reaction products out of the combustion product gases in a wet separator; and if the reacting step is conducted under below-stoichiometric conditions, for the separating step to include precipitating the pulverulent reaction products from the combustion product gases in a dry separator.

The method of the present invention advantageously further comprises the step of admixing at least one member of the group consisting of sodium carbonate, sodium bicarbonate, sodium sulfate, $NaOH$ and $Al_2O_3$ to the combustion product gases in the temperature range below 500° C. In this context, it is also advantageous for the method to further comprise the step of firing particularly the sodium bicarbonate at 250° to 330° C. in a hot gas stream; and for the admixing step to include introducing the resultant compound into the combustion product gas stream upstream of the separator in a temperature range below 250° C. The reacting step may include introducing the $NH_3$, especially in the form of hartshorn salt, into the combustion product gas stream in the temperature range below 330° C. for maximum desulfurization, and in the temperature range obove 250° C. for maximum denitrification.

The method of the present invention may further comprise the step of subjecting the combustion product gases during the reacting step to electric fields, or to electron bombardment with a high electron density, to increase the reactivity of the reagents contained in the combustion product gases.

According to another aspect of the present invention, the method further comprises the step of admixing to the combustion product gases at least one member of the group consisting of sodium and hydrogen sulfites and other reduction agents which form sulfites with the $SO_2$ contained in the combustion product gases, in the temperature range below 500° C. This admixing step advantageously includes introducing into the combustion product gases a mixture containing about 30% of at least one member of the group consisting of $Na_2So_3$ and $NaHSO_3$, and increasing the percentage of the at least one member in the mixture with increasing $NO_x$ contents of the combustion product gases.

The method of the present invention may further comprise the step of admixing $NaHCO_3$ to the at least one member prior to the reacting step when the combustion product gases have a high $SO_2$ contents, especially when the $SO_2$-$NO_x$ ratio exceeds 2, admixing $NaHCO_3$ and at least one member of the group consisting of $Na_2SO_3$ and $NaHSO_3$ to the at least one member prior to the reacting step when the $SO_2$-$NO_x$ ratio in the combustion product gases is between 1 and 2, and admixing at least one member of the group consisting of $Na_2SO_3$ and $NaHSO_3$ to the at least one member prior to the reacting step, especially when the $SO_2$-$NO_x$ ratio in the combustion product gases is below 1. In this connection, it is also advantageous when the admixing step further includes adding water and controlling the amount of the added water in such a manner in dependence on the combustion product gas temperature, the combustion product gas amount and the evaporation time available prior to reaching the separator that the reaction products reach the separator substantially in their dry state.

According to another concept of the present invention, there are provided the steps of removing the entrained dust from the combustion product gases prior to the reacting step with a high degree of effectiveness; moistening a portion of the removed dust, especially about 10% thereof; and introducing the moistened portion, together with sodium compounds, into the combustion product gas stream. In the alternative, there is provided the step of removing the entrained dust from the combustion product gases prior to the reacting step with a poor degree of effectiveness, especially in the range of about 90%.

Surprisingly, it has been determined that even the further treatment of the separated dust has been improved by the present invention, and the soluble components, such as sodium and ammonium salts are made available for recovery of the chemical substances which are needed for the absorption. As a result of this, on the one hand, the amount of the dust is reduced and, on the other hand, the dust is homogenized, wherein the possibly unreacted CaO is bound. This secondary measure improves the discharge product with respect to its further use in the construction industry, as well as in its use as a deposit material.

BRIEF DESCRIPTION OF THE DRAWING

The present invention will now be described in detail with reference to the accompanying drawing, in which.

DETAILED DESCRIPTION OF THE PREFERRED EMBODIMENTS

Figure 1:
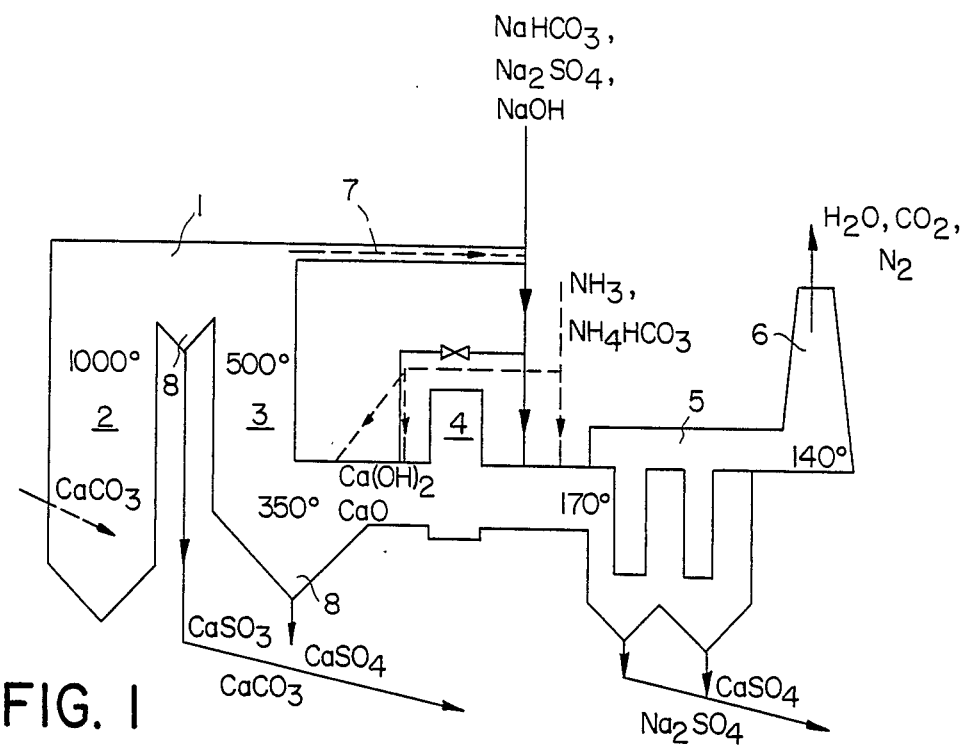
FIG. 1 is a diagrammatic view of a desulfurization installation in accordance with the present invention, which is arranged downstream of a steam generator.

Referring now to the drawing in detail, it may be seen that the reference numeral 1 has been used therein to identify a steam generator of a thermal electric power generating plant with an electric power output of, for instance, 100 MW, in which a sulfur-containing fossil fuel, such as for instance lignite, is being burned, and from which a combustion product gas of a usual composition ($CO_2$, $O_2$, $H_2O$, $N_2$) is discharged. On the average, 50 g of dust (fly ash), 4000 mg of $SO_2$, 450 mg of $NO_x$ (as NO), and also possibly Cl (as noxious gas), are contained in each $m^3$ of the combustion product gas. While the chlorine and the $SO_2$ are specific to the fossil fuel being burned, the $NO_x$ contents is largely dependent on the combustion chamber configuration or on the combustion chamber loading.

The removal of the chlorine and of $SO_2$ can be accomplished by using absorption means on the basis of alkaline earths or alkali, while $NO_x$ must be reduced. Catalysts could be used for accelerating the reduction reaction. However, it is an object of the present invention to perform the operation without any additional catalysts. As a result of a pre-treatment of the combustion product gases originated in the combustion chamber, especially by blowing limestone powder into such gases, or also by the selection of the fossil fuel being burned and appropriate combustion chamber configuration, it is possible to influence the $SO_2$-$NO_x$ ratio in such a manner that a value exceeding 2 is achieved in the partially cooled-off combustion product stream in the temperature range below 500° C. ahead of a dust filter. A dry electrostatic or cloth filter is being used as the dust filter.

Now, $Na_2SO_3$ and/or $NaHCO_3$ as well as $NH_3$ are blown into the combustion product gas ahead of the filter in the temperature range below 500° C. When the $SO_2$ contents is high and when the $SO_2$-$NO_x$ ratio is greater than 2, $NaHCO_3$ and/or $Na_2CO_3$ as well as $NH_3$ are blown in, as a result of which the sodium carbonate is converted by the acceptance of $SO_2$ into sodium sulfite. The sodium sulfite then reduces the $NO_x$ into $N_2O$ which is reduced by $NH_3$ into $N_2$. As a result of this series of reactions, there is obtained a soluble sodium sulfate, $N_2$, and water vapor. The chemical process is accelerated by the crystallization water in the sodium carbonate and by possibly adhering moisture, so that the effectiveness of the reactions is improved.

If the $SO_2$-$NO_x$ ratio drops to 1, sodium sulfite (wet or dry) is admixed to the sodium carbonate, or is additionally injected in a wet state, while only sodium sulfite is blown in with the $NH_3$ or is injected as a suspension if the above ratio has values below 1. Instead of the $NaHCO_3$, $Na_2CO_3$ and/or other alkaline earth/alkali metal compounds such as, for instance, CaO, MgO and/or $K_2O$ can also be blown in or injected in an aqueous solution. Instead of or possibly in addition to the $Na_2SO_3$, $NaHSO_3$ or $CaSO_3$, $K_2SO_3$, $KHSO_3$ or $MgSO_3$ can also be blown in. Similarly, an $NH_3$-releasing substance such as, for instance, $NH_4OH$ or also $NH_4HCO_3$ (hartshorn salt) can be used instead of the $NH_3$. The introduction of the various substances can also be accomplished separately or, for achieving a better dispersion, in a plurality of spatially successive operations; however, the required stoichiometry must be observed. It has been established that, when wet substances or suspensions are being used, there can be obtained a degree of removal of up to 80% even at a stoichiometry of 1.

The temperature in a combination chamber 2 amounts to about 1000° C., at the entrance into a second heating flue 3 to 500° C., ahead of an air pre-heater 4 to 350° C. and at a dry separator 5 to 170° C. The combustion product gas escapes through a stack 6 at 140° C.

The brown coal or lignite being burned contains lime, or lime is introduced into the combustion chamber 2 for partial desulfurization to approximately 2000 $mg/m^3$. In order to achieve this desulfurization, the Ca/S ratio (stoichiometry 3) must be maintained in the combustion product gas stream, as a result of which CaO or Ca(OH)

particles are entrained for travel with such gases into the dry separator 5. ;p During the measurement of the results obtained in the following tests, there has also be established a dependency of the noxious substance removal by the entrained fly ash, especially when the fly ash contained $Al_2O_3$ (bauxite) which is mostly contained in the coal ashes. There has been observed an improvement when, in the event of burning coal with a low Al contents, a small bauxite level in the combustion product gas was maintained during the removal of the noxious substances, that is, in the region of below 500° C., by addition of bauxite. In this event, $Al_2O_3$ in the order of magnitude of 10% is admixed to the $NH_3$-releasing substance or to the sodium bicarbonate.

For the achievement of a desulfurization and denitrification, sodium bicarbonate is added to the combustion product gas at a stoichiometric ratio of Ca to $SO_2$ amounting to 1.2 at a temperature of about 290° C., as a result of which purified gas values of 400 mg of $SO_2$ and 400 mg of $NO_x$ are achieved. This results in a total desulfurization of 80% and a total denitrification of 20%.

ALTERNATIVE EXAMPLE 1

When a mixture of 75% of sodium bicarbonate and 25% of hartshorn salt is introduced instead of the 100% of sodium bicarbonate, at a stoichiometry of 1, then there are achieved purified gas values of 300 mg of $SO_2$ and 150 mg of $NO_x$.

ALTERNATIVE EXAMPLE 2

When using a mixture of 90% of sodium bicarbonate and 10% of hartshorn salt at a stoichiometry of 0.9, there are obtained purified gas values of 350 mg of $SO_2$ and 180 mg of $NO_x$.

ALTERNATIVE EXAMPLE 3

When, instead of using the hartshorn salt of the alternative example 2, there is introduced an $NH_3$ gas, and the $NH_3$ gas is introduced directly into the filter, especially ahead of a cloth filter, at a stoichiometry of $NH_3$ to $SO_2$ of 0.5, then there is obtained a purified gas containing 400 mg of $SO_2$ and 400 mg of $NO_x$.

ALTERNATIVE EXAMPLE 4

When $NH_4OH$ in an aqueous solution is introduced instead of the $NH_3$ gas with the same stoichiometry as in the alternative example 3, then there is obtained a purified gas value of 400 mg of $SO_2$ and 200 mg of $NO_x$.

ALTERNATIVE EXAMPLE 5

When, with all other values remaining the same as in the alternative example 2, the mixture ratio between the sodium bicarbonate and the hartshorn salt is changed to 95% to 5%, then there result with a stoichiometry of 0.8 purified gas values of 400 mg of $SO_2$ and 450 mg of $NO_x$.

ALTERNATIVE EXAMPLE 6

When only hartshorn salt is added to the combustion product gas with the stoichiometry of 0.2, at 40° C. and with a filter temperature of 140° to 160° C., and there are obtained purified gas values of 400 mg of $SO_2$ and 450 mg of $NO_x$.

ALTERNATIVE EXAMPLE 7

When the stoichiometry is increased with respect to the alternative example 6 to 1, then the purified gas values are improved to 100 mg of $SO_2$ and 400 mg of $NO_x$.

ALTERNATIVE EXAMPLE 8

When the introduction temperature is increased to 340° C. and the temperature at the filter is increased to 190° C. with respect to the alternative example 7, then there is achieved a purified gas value of 600 mg of $SO_2$ and 250 mg of $NO_x$.

ALTERNATIVE EXAMPLE 9

When an electrostatic filter which performs an initial dust removal to the extent of about 85% is additionally provided ahead of the equipment performing in accordance with the alternative example 8, then the $NO_x$ values are improved to 150 mg.

ALTERNATIVE EXAMPLE 10

When the lime introduction into the steam-generating boiler in accordance with the alternative example 1 is cancelled and the sodium bicarbonate is introduced into the combustion product gas with a stoichiometry of 1.5 at a temperature of 250° C., while the temperature of 190° C. is not exceeded in the following cloth filter, there result the purified gas values of 600 mg of $SO_2$ and 400 mg of $NO_x$.

ALTERNATIVE EXAMPLE 11

When, instead of the sodium bicarbonate of the alternative example 10, hartshorn salt is introduced with a stoichiometry of 1.05 and at a temperature of 40° C., then there are obtained at a filter temperature of 150° C. purified gas values of 200 mg of $SO_2$ and 400 mg of $NO_x$.

ALTERNATIVE EXAMPLE 12

When a mixture of 90% of sodium bicarbonate and 10% of hartshorn salt is used with a stoichiometry of 1 and at a combustion product gas temperature of 300° C., then there are obtained purified gas values of 300 mg of $SO_2$ and 300 mg of $NO_x$.

For the clarification of the above test results of the alternative examples 1 to 12 which appear to be contradictory, it is pointed to the following groups of chemical formulas:

1. $CaCO_3$     $CaO+CO_2$
   $CaO+SO_2+\frac{1}{2} O_2$     $CaSO_4$
   $CaO+H_2O$     $Ca(OH)_2$
2. $2\ NaHCO_3$     $Na_2CO_3+CO_2+H_2O$
   $Na_2CO_3+SO_2$     $Na_2SO_3+CO_2$
   $Na_2SO_3+NO$     $Na_2SO_4+\frac{1}{2} N_2$
3. $NaHSO_3+NO+NH_3+.75\ O_2$     $Na_2SO_4+N_2+1.5\ H_2O$
   $NH_4HCO_3$     $NH_3+CO_3+H_2O$
   $2\ NH_4HCO_3+SO_2+\frac{1}{2} O_2$     $(NH_4)_2SO_4+2\ CO_2+H_3O$
   (+NO alt.)     (+$\frac{1}{2}$ $N_2$ alt.)
   $2\ NH_3+H_2O+SO_2+\frac{1}{2} O_2$     $(NH_4)_2SO_4$
   (+NO alt.)     (+$\frac{1}{2}$ $N_2$alt.)
   $2\ NH_3+H_2O+SO_2$     $(NH_4)_2SO_3$
   $(NH_4)_2SO_3+SO_2+H_2O$     $2\ NH_4HSO_3$
   $NH_4HSO_3+NH_3$     $(NH_3)_2SO_3$
4. $Na_2SO_4+2\ NH_4NCO_3$     $2\ NaHCO_3+(NH_4)_2SO_4$
   $Na_2SO_4+2\ NH_3+2\ CO_2+2\ H_2O$     $2\ NaHCO_3+(NH_4)_2SO_4$
   $Na_2SO_4+Ca(OH)_2$     $CaSO_4+2\ NaOH$
   $NaOH+NH_3+2\ CO_2+H_2O$     $NaHCO_3+NH_4HCO_3$
   $(NH_4)_2SO_4$     $NH_4HSO_4+NH_3$
   $(NH_4)_2SO_4+Ca(OH)_2$     $CaSO_4+2\ NH_3+2\ H_2O$
   $NH_3+CO_2+H_2O$     $NH_4HCO_3$
   $(NH_4)_2SO_4+Ca(OH)_2+2\ CO_2$     $CaSO_4+2\ NH_4HCO_3$
   $CaSO_4+2\ NH_4HCO_3$     $CaCO_3+(NH_4)_2SO_4+CO_2++H_2O$

| | |
|---|---|
| NH$_4$HSO$_4$ + NH$_3$ | (NH$_4$)$_2$SO$_4$ |

The first group gives the chemical reactions encountered in the combustion product gas stream in the temperature range exceeding 700° C.

The second group gives the chemical reactions taking place when sodium carbonate is added in the temperature range below 500° C.

The third group gives the chemical combinations encountered with the cooperation of NH$_3$ in the temperature range below 500° C.

The fourth group gives the combinations occurring in the dry separator between the individual reaction groups (recycling or reactivation of the input substances, circulation products, intermediate products).

From the above formulas, there can be seen the catalyst-like effect of the NH$_3$ which, for all intents and purposes, is not consumed, that is, it is reached but is subsequently released again. A similar effect, in a less pronounced degree, is shown by the sodium which binds the SO$_2$ and presents the sulfur ion to the calcium ion and subsequently reenters the circulation with the NH$_3$ in the form of sodium lye or NaHCO$_3$. The compounds which are to be separated out are CaSO$_4$ and CaCO$_3$ which are, for all intents and purposes, free of ammonium salts.

It can further be seen from the above reaction equations that the denitrification of the combustion product gases takes place predominantly during the conversion of the sodium sulfite into the sodium sulfate. It has been established that the denitrification functions especially well when the reactions represented by the above formula groups 2 and 3 are performed, while the formula group 3 alone exhibits practically no denitrification. It is apparent that the oxygen acceptance in the formulas of the group 3 takes place mainly by the reduction of the NO. Therefore, NO was put in parentheses in the relevant formulas.

As can further be established from the equations of the groups 2 and 4, the transition from NaHCO$_3$ to Na$_2$SO$_3$ or Na$_2$SO$_4$ is gradual so that, instead of the NaHCO$_3$, NaOH or even Na$_2$SO$_3$ can be used under certain circumstances. The later compound is a by-product of the wood pulp industry, and it can be used for binding the noxious substances or for reactivating the partially used-up lime. Inasmuch as the sodium compounds and the NH$_3$ are hardly used up, they are used in below-stoichiometric amounts, and they serve for separating the used-up layers of the only partially used-up lime granules and to prepare unused layers by NaOH and NH$_4$OH in molecular sizes for the SO$_2$ acceptance.

Herein, the NaHCO$_3$ can be particularly activated by being fired in the temperature range of 330° to 250° C., in that a partial stream 7 containing about 1-2% of the combustion product gas which is at a temperature of about 500° C. at the entrance into the second heating flue 3 is used as a carrier gas stream for the blowing-in of the NaHCO$_3$ in the temperature range around 300° C.

In order to reduce the loading of the dry separator 5, which is constructed as a cloth filter and thus constitutes a sort of a reaction apparatus, a plurality of separation locations or devices 8 for the fly ash are provided in the stream generator 1. In this sense, it is also of advantage to arrange for the addition of the NaHCO$_3$, especially in its fired form, downstream of the air preheater 4, so as to reduce the loading of the heat-exchange surfaces with dust.

Figure 2:
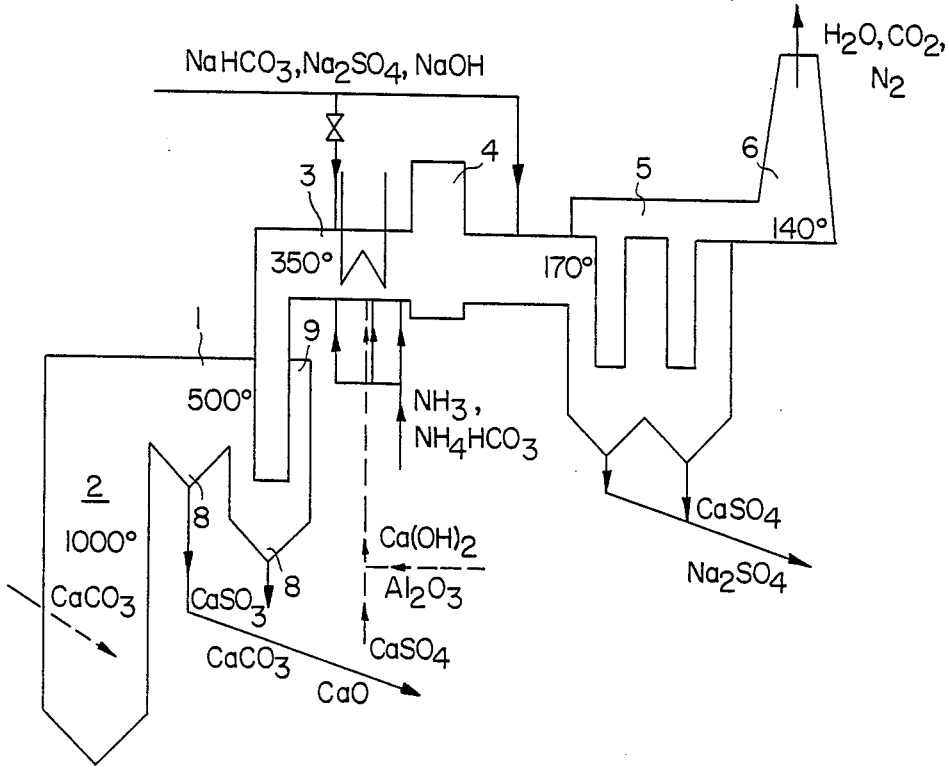
FIG. 2 is a view similar to FIG. 1 but showing a modified construction.

FIG. 2 of the drawing shows a construction which is somewhat modified with respect to that of FIG. 1, wherein a hot gas cleaning arrangement 9 is arranged at the outlet of the steam generator 1, especially upstream of the beginning of the second heating flue 3. In accordance with the present invention, the hot gas cleaning arrangement 9 operates in one of the following modes:

(a) The hot gas cleaning arrangement 9 operates with a cleaning effect in excess of 90%, which means that the passage of the CaO or Ca(OH)$_2$ therethrough is substantially prevented and the necessary Ca(OH)$_2$ and, as the case may be, the Al$_2$O$_3$ are reintroduced downstream of the separator. This results in a situation where a practically pure CaSO$_4$ or Na$_2$SO$_4$ is obtained in the dry separator 5, so that the recovery of these substances is facilitated thereby.

(b) The hot gas cleaning arrangement 9 operates with a cleaning effect of less than 90%, which means that the requisite amount of the Ca(OH)$_2$ passes through the filter, as a result of which the installation operates similarly to that of FIG. 1. Only adjustment amounts of fresh Ca(OH)$_2$ and possibly Al$_2$O$_3$ are introduced in order to keep the level of the contaminants in the combustion product gas constant, as a result of which the amount of filtered-out dust is minimized.

In order to minimize the amounts of the required chemical compounds, it is recommended to leach the dust obtained from the dry separator 5 and to crystallize the fluid phase after the performance of carbonation; herein, in addition to the mother liquor, there are also obtained the required recirculating chemical compounds which make up approximately 70 to 90% of the amount needed for the absorption. The best recovery results are achieved when the SO$_2$-NO$_2$ ratio in the combustion product gas is greater than 2, since in this case the Na$_2$SO$_3$ requirement is at the lowest level and the recovery arrangement supplies basically a mixture of hartshorn salt and sodium bicarbonate.

The important chemical reactions in the combustion product gas stream are:

| | |
|---|---|
| NaHSO$_3$ + 2 NO | NaHSO$_4$ + N$_2$O |
| Na$_2$SO$_3$ + 2 NO | Na$_2$SO$_4$ + N$_2$O or |
| CaSO$_3$ + 2 NO + .75 O$_2$ | CaSO$_4$ + N$_2$O | and, instead of N$_2$O+NO—N$_2$+NO (in the absence of NH$_3$), there results

| | |
|---|---|
| 2 NH$_3$ + 3N$_2$O | 3H$_2$O + 4 N$_2$ | wherein Na$_2$SO$_3$ or CaSO$_3$ is either supplied or is produced in the combustion product gas in accordance with

| | |
|---|---|
| 2 NaOH + SO$_2$ | Na$_2$SO$_3$ + H$_2$O |
| NaHCO$_3$ + SO$_2$ | Na$_2$SO$_3$ + CO$_2$ |
| Na$_2$CO$_3$ + SO$_2$ | Na$_2$SO$_3$ + CO$_2$ or |
| CaO + SO$_2$ | CaSO$_3$ |

NH$_3$ can also be obtained from

| | |
|---|---|
| NH$_4$OH or from | NH$_3$ + H$_2$O |

| | -continued |
|---|---|
| NH$_4$HCO$_3$ | NH$_3$ + H$_2$O + CO$_2$ |

No particular value is attributed to the purity of the chemical substances; thus, a considerable pollution with higher carbonates, bicarbonates etc. and with sulfites, bisulfites etc., or their mixture with potassium or calcium sulfites is not disturbing, so that chemical substances obtained from recycling plants can be utilized, so long as no additional poisons (heavy metals) are introduced.

Case has to be taken during the introduction of suspensions or solutions containing the sorbents into the combustion product gas to assure that the liquid is vaporized prior to entering the dry filter, so as to assure that no encrustations form in the filter and that the dust can be removed in its pulverulent form. Inasmuch as the temperature and the amount of the combustion product gas at the point of injection, and the distance of such point from the dry filter (dwell time of the droplets in the combustion product gas) are known, the maximum amount of the liquid which can be injected is predetermined thereby.

Thus, the invention renders possible the desulfurization and denitrification of the combustion product gas in an installation part which is available to begin with and in this manner avoids the otherwise existing need for providing additional desulfurization and denitrification equipment which would occupy a very large amount of space. It is further a characteristic feature of the invention that the desulfurization, denitrification and dust removal are performed in the same part of the installation.

It is further possible and contemplated within the framework of the invention to employ a wet separator instead of the dry separator 5. This would appear to make much sense when the combustion product gases are utilized in their cooled state for the extraction of CO$_2$, for instance, in a combustion product gas neutralization installation, and/or for the extraction of nitrogen.

While the invention has been described on the basis of certain specific examples, it is not intended to be limited thereto; rather, the scope of protection is to be determined solely by the appended claims.

What is claimed is:

1. A method of purifying combustion product gases discharged from fossil fuel burning plants, which carry entrained dust including an alkaline earth compound as they leave the combustion chamber, comprising the steps of;

reacting at least a partial stream of the dust-containing combustion product gases in the temperature range below 500° C. with at least one member selected from the group consisting of NH$_3$, NH$_4$OH, hartshorn salt and substances which yield such compounds by thermal decomposition, with attendant formation of pulverulent reaction products;

adding NaHCO$_3$ or a mixture of the NaHCO$_3$ with at least one alkaline compound selected from the group consisting of CaO, Ca(OH)$_2$, NaOH, Na$_2$SO$_4$ and Al$_2$O$_3$ in a dry and particulate condition thereof to the combustion product gases, with attendant formation of additional pulverulent reaction products; and separating the pulverulent reaction products, together with the remaining entrained dust, from the combustion product gas in a dust separator;

wherein said separating step includes passing the combustion product gases through a dry separator constructed as a cloth filter to prolong the dwell time of the reaction products in the combustion product gases and to avoid the seperation of NH$_3$ or of NH$_4$-containing compounds in the separator.

2. The method as defined in claim 1, wherein CaO is added as said alkaline earth compound in the combustion chamber.

3. The method as defined in claim 1, wherein said reacting step is conducted under below-stoichiometric conditions; and wherein said separating step includes precipitating the pulverulent reaction products from the combustion product gases in a dry separator.

4. The method as defined in claim 1, further comprising the step of firing the sodium bicarbonate at 250° to 330° C. in a hot gas stream; and wherein said admixing step includes introducing the resultant compound into the combustion product gas stream upstream of the separator in a temperature range below 250° C.

5. The method as defined in claim 1, wherein said reacting step includes introducing the NH$_3$ into the combustion product gas stream in the temperature range below 330° C. for maximum desulfurization, and in the temperature range above 250° C. for maximum denitrification.

6. The method as defined in claim 1, and further comprising the step of subjecting the combustion product gases during said reacting step to electric fields to increase the reactivity of the reagents contained therein.

7. THe method as defined in claim 1, and further comprising the step of subjecting the combustion product gases during said reacting step to electron bombardment to increase the reactivity of the reagents contained therein.

8. The method as defined in claim 1, and further comprising the step of admixing to the combustion product gases at least one member of the group consisting of sodium and hydrogen sulfites which form sulfites with the SO$_2$ contained in the combustion product gases, in the temperature range below 500° C.

9. The method as defined in claim 8, wherein said admixing step includes introducing into the combustion product gases a mixture containing about 30% of at least one member of the group consisting of Na$_2$SO$_3$ and NaHSO$_3$, and then increasing the percentage of said at least one member in said mixture when NO$_x$ content of the combustion product gases increases.

10. The method as defined in claim 1, and further comprising the step of admixing NaHCO$_3$ to said at least one member prior to said reacting step when the combustion product gases have a SO$_2$-NO$_x$ ratio in excess of 2.

11. The method as defined in claim 1, and further comprising the step of admixing NaHCO$_3$ and at least one member of the group consisting of Na$_2$SO$_3$ and NaHSO$_3$ to said at least one member prior to said reacting step when the SO$_2$-NO$_x$ ratio in the combustion products gases is between 1 and 2.

12. The method as defined in claim 1, and further comprising the step of admixing at least one member of the group consisting of Na$_2$SO$_3$ and NaHSO$_3$ to said at least one member prior to said reacting step when the SO$_2$-NO$_x$ ratio in the combustion product gases is below 1.

13. The method as defined in claim 1, and further comprising the step of removing the entrained dust from the combustion product gases prior to said reacting step with a degree of effectiveness in the range of about 90%.

14. The method of claim 1, wherein the combustion product gases are produced by burning lignite in a stream generator.

15. The method of claim 1, wherein both $SO_2$ and $NO_x$ inpurities in the combustion product gases are reduced or eliminated entirely.

16. The method of claim 1, wherein NaOH or $NaHCO_3$ alkaline compound added reacts with sulfur dioxide impurities in the gases to form sodium sulfite, which in turn reacts with NO impurities in the gases to form sodium sulfate and $N_2O$, which in turn reacts with the $NH_3$ to form $H_2O$ and $N_2$.

17. The method of claim 16, wherein CaO alkaline compound added reacts with the sulfur dioxide to form $CaSO_3$, which in turn reacts with the NO impurities and the $NH_3$ to form $CaSO_4$ and $N_2O$.

18. The method of claim 5, wherein said admixing step includes introducing the resultant compound into the combustion gas stream upstream of the separator in a temperature range below 250° C.

19. The method of claim 1, further comprising the step firing the $NaHCO_3$ in a temperature range of 330°–250° C. by adding the same to a partial stream of said combustion product gases.

* * * * *